United States Patent
Shimokawa et al.

(10) Patent No.: US 8,846,137 B2
(45) Date of Patent: Sep. 30, 2014

(54) METHOD OF MANUFACTURING A MAGNETIC DISK

(75) Inventors: Koichi Shimokawa, Tokyo (JP); Katsushi Hamakubo, Tokyo (JP); Kae Itoh, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 434 days.

(21) Appl. No.: 12/708,050

(22) Filed: Feb. 18, 2010

(65) Prior Publication Data

US 2010/0209601 A1    Aug. 19, 2010

(30) Foreign Application Priority Data

Feb. 19, 2009 (JP) ................................ 2009-036068
Feb. 18, 2010 (JP) ................................ 2010-033277

(51) Int. Cl.
*G11B 5/72* (2006.01)
*G11B 5/725* (2006.01)
*G11B 5/82* (2006.01)
*G11B 5/84* (2006.01)

(52) U.S. Cl.
CPC .............. *G11B 5/82* (2013.01); *G11B 5/8408* (2013.01)
USPC ............ 427/131; 427/127; 427/128; 427/130

(58) Field of Classification Search
CPC ................................ G11B 5/72; G11B 5/725
USPC ................................................ 427/127–132
See application file for complete search history.

(56) References Cited

U.S. PATENT DOCUMENTS

| | | | |
|---|---|---|---|
| 5,851,601 A * | 12/1998 | Mehmandoust et al. | 427/561 |
| 6,136,421 A * | 10/2000 | Chen | 428/216 |
| 6,403,149 B1 * | 6/2002 | Parent et al. | 427/130 |
| 6,613,422 B1 * | 9/2003 | Ma et al. | 428/212 |
| 2001/0021412 A1 * | 9/2001 | Watanabe et al. | 427/130 |
| 2002/0048693 A1 | 4/2002 | Tanahashi et al. | |
| 2003/0077982 A1 * | 4/2003 | Takizawa | 451/36 |
| 2004/0137221 A1 * | 7/2004 | Zeira et al. | 428/333 |

FOREIGN PATENT DOCUMENTS

| | | | |
|---|---|---|---|
| EP | 0320241 A2 | 6/1989 | |
| JP | 62-66417 A | 3/1987 | |
| JP | 63-257919 | * 10/1988 | G11B 5/84 |
| JP | 2001-152176 | 6/2001 | |
| JP | 2002-74648 A | 3/2002 | |
| JP | 2006-089663 | 4/2006 | |

OTHER PUBLICATIONS

Search and Examination Report from Singapore Patent Application No. 201001084-1 dated Jun. 5, 2011, 8 pages.
Japanese Office Action dated Feb. 29, 2014 for related Japanese Application No. JP2010-033277, pp. 2.

* cited by examiner

*Primary Examiner* — Mandy Louie

(57) ABSTRACT

On manufacturing a magnetic disk having at least a magnetic layer (60), a protective layer (70), and a lubricating layer (80) formed in this order over a substrate (10), the lubricating layer is formed by using a coating solution in which a perfluoropolyether compound having a perfluoropolyether main chain and a hydroxyl group in a structure thereof is dispersed and dissolved in a fluorine-based solvent having a boiling point of 90° C. or more.

6 Claims, 2 Drawing Sheets

METHOD OF MANUFACTURING A MAGNETIC DISK

This application is based upon and claims the benefit of priority from Japanese Patent Application No. 2009-036068, filed on Feb. 19, 2009, and Japanese Patent Application No, 2010-033277, filed on Feb. 18, 2010, the disclosures of which are incorporated herein in their entirety by reference.

TECHNICAL FIELD

This invention relates to a method of manufacturing a magnetic disk adapted to be mounted in a magnetic disk apparatus such as a hard disk drive (hereinafter abbreviated as a HDD).

BACKGROUND ART

Various information recording techniques have been developed following the increase in volume of information processing in recent years. Particularly, the areal recording density of HDDs using the magnetic recording technique has been increasing at an annual rate of about 100%. Recently, the information recording capacity exceeding 250 GB has been required per 2.5-inch magnetic disk adapted for use in a HDD or the like. In order to satisfy such a requirement, it is necessary to realize an information recording density exceeding 400 Gbits/inch$^2$. In order to achieve the high recording density in a magnetic disk for use in a HDD or the like, it is necessary to reduce the size of magnetic crystal grains forming a magnetic recording layer serving to record information signals, and further, to reduce the thickness of the layer. However, in the case of conventionally commercialized magnetic disks of the in-plane magnetic recording type (also called the longitudinal magnetic recording type or the horizontal magnetic recording type), as a result of the reduction in size of magnetic crystal grains, there has been the occurrence of a thermal fluctuation phenomenon where the thermal stability of recorded signals is degraded due to superparamagnetism so that the recorded signals are lost. This has been an impeding factor for the increase in recording density of the magnetic disks.

In order to solve this impeding factor, magnetic recording media of the perpendicular magnetic recording type have been proposed in recent years. In the case of the perpendicular magnetic recording type, as is different from the case of the in-plane magnetic recording type, the easy magnetization axis of a magnetic recording layer is adjusted so as to be oriented in a direction perpendicular to the surface of a substrate. As compared with the in-plane magnetic recording type, the perpendicular magnetic recording type can suppress the thermal fluctuation phenomenon and thus is suitable for increasing the recording density. As such a perpendicular magnetic recording medium, there is known a so-called two-layer perpendicular magnetic recording disk comprising, over a substrate, a soft magnetic underlayer made of a soft magnetic substance and a perpendicular magnetic recording layer made of a hard magnetic substance, as is described in, for example, JP-A-2002-74648.

In the meantime, a conventional magnetic disk is provided with a protective layer on a magnetic recording layer formed over a substrate and further with a lubricating layer on the protective layer in order to ensure the durability and reliability of the magnetic disk. Particularly, the lubricating layer used at the outermost surface is required to have various properties such as long-term stability, chemical substance resistance, anti-friction property, and heat resistance.

In order to satisfy such a requirement, perfluoropolyether-based lubricants having hydroxyl groups in molecules have often been used as lubricants for magnetic disks. For example, according to JP-A-862-66417 or the like, there is well known a magnetic recording medium or the like coated with a perfluoroalkylpolyether lubricant having a structure of $HOCH_2CF_2O(C_2F_4O)_p(CF_2O)_qCF_2CH_2OH$ containing hydroxyl groups at both ends of a molecule. It is known that when hydroxyl groups are present in molecules of a lubricant, the lubricant has excellent adhesion to a protective layer due to the interaction between the protective layer and the hydroxyl groups.

SUMMARY OF THE INVENTION

Problem to be Solved by the Invention

As described above, the information recording density exceeding 400 Gbits/inch$^2$ has been required in recent HDDs. In order to effectively use the limited disk area use has been made of a HDD of the LUL (load/unload) system, as a HDD start/stop mechanism, instead of a conventional HDD of the CSS (contact start/stop) system. In the LUL system, a magnetic head is retreated to an inclined platform called a ramp located outside a magnetic disk while the HDD is stopped, then in a start-up operation, the magnetic head is caused to slide from the ramp, after the magnetic disk starts to rotate, so as to fly over the magnetic disk to perform recording/reproduction. In a stop operation, the magnetic head is retreated to the ramp outside the magnetic disk and then the rotation of the magnetic disk is stopped. This sequence of the operations is called a LUL operation. In the magnetic disk mounted in the HDD of the LUL system, it is not necessary to provide a contact sliding region (CSS region) for the magnetic disk, which is required in the CSS system, thus it is possible to increase a recording/reproducing region, and therefore, the LUL system is preferable for increasing the volume of information as compared with the CSS system.

In order to improve the information recording density under these circumstances, it is necessary to reduce a spacing loss as much as possible by reducing the flying height of the magnetic head. In order to achieve the information recording density exceeding 400 Gbits/inch$^2$, it is necessary to set the flying height of the magnetic head to 5 nm or less. In the LUL system, as is different from the CSS system, since it is not necessary to provide an uneven shape for CSS on the surface of the magnetic disk, it is possible to significantly smooth the surface of the magnetic disk. Consequently, in the case of the magnetic disk mounted in the HDD of the LUL system, the flying height of the magnetic head can be further reduced as compared with the CSS system and therefore there is also an advantage that it is possible to increase the S/N ratio of a recording signal and thus to contribute to an increase in recording volume of the HDD.

Because of the further reduction in magnetic head flying height following the recent introduction of the LUL system, it has become necessary that a magnetic disk stably operate even in the case of a low flying height of 5 nm or less. Especially, as described above, the magnetic disks have been shifted from the in-plane magnetic recording type to the perpendicular magnetic recording type in recent years, so that an increase in volume of the magnetic disks and a reduction in flying height following it have been strongly demanded.

Recently, magnetic disk apparatuses have started to be often used not only as storage devices of conventional personal computers, but also for mobile applications such as mobile phones and car navigation systems and, therefore, due to diversification of applications, the environmental resistance required for magnetic disks has become very strict. Therefore, in view of these circumstances, it is urgently necessary, more than conventional, to further improve the durability of magnetic disks, the durability of lubricants forming lubricating layers, and so on.

Following rapid improvement in information recording density of magnetic disks in recent years, it is required to reduce the magnetic spacing between a magnetic head and a recording layer of a magnetic disk and, therefore, it has become necessary to further reduce the thickness of a lubricating layer present between the magnetic head and the recording layer of the magnetic disk. A lubricant used as the lubricating layer at the outermost surface of the magnetic disk largely affects the durability of the magnetic disk. Even if the thickness of the lubricating layer is reduced, the stability and reliability are essential for the magnetic disk.

Conventionally, the lubricating layer is formed by using a solution in which a perfluoropolyether-based lubricant is dispersed and dissolved in an appropriate solvent and coating the solution, for example, by a dipping method.

As the solvent, use is generally made of a fluorine-based solvent such as Vertrel (trade name) manufactured by DuPont-Mitsui Fluorochemicals Co., Ltd. By the presence of polar groups such as hydroxyl groups in molecules of a lubricant, the lubricant has excellent adhesion to a carbon-based protective layer due to the interaction between the protective layer and the hydroxyl groups in the molecules of the lubricant and, therefore, use is preferably made of a perfluoropolyether lubricant particularly having hydroxyl groups at both ends of each molecule.

However, the above-mentioned fluorine-based solvent (trade name: Vertrel) has a boiling point of 55° C. and thus should be used at room temperature, When dispersed and dissolved in the above-mentioned solvent at such a low temperature, the conventional highly polar lubricant having the polar groups such as the hydroxyl groups in the molecules tends to be subjected to aggregation because the molecules or the polar groups are attracted to each other due to the interaction therebetween. If the lubricating layer is formed by using a coating solution in which the aggregation of the lubricant has occurred, the lubricating layer having a uniform thickness and a good coverage is difficult to obtain unless its thickness is set to be relatively large. This, however, causes a problem that the reduction in magnetic spacing cannot be achieved. Further, if the polar groups of the lubricant are attracted to each other, the number of polar groups of the lubricant that are effectively bonded to active sites on the protective layer is reduced so that the adhesion of the lubricating layer is lowered. Accordingly, if the magnetic disk is used with the magnetic head flying at an ultra-low flying height of, for example, 5 nm or less, pickup of the lubricant (phenomenon in which the lubricant is transferred to the head side) tends to occur, thereby causing a failure of the HDD. Further, the surface tension of the above-mentioned fluorine-based solvent (trade name: Vertrel) is relatively low. Therefore, during dip coating, in the process of lifting a disk, a region which is still wet after a disk surface emerges from the coating solution of the lubricant into the air has a small width (i.e., a width in a lifting direction from a liquid surface) and the coating state is susceptible to the influence of a ripple of the liquid surface caused upon lifting the disk. In this event, stripe-like coating unevenness tends to occur particularly on the outer peripheral side of the surface of the disk.

As described above, it is required to realize a magnetic disk having high reliability even with the reduction in magnetic spacing and the low flying height of a magnetic head following the increase in recording density in recent years.

This invention has been made in view of the above-mentioned conventional problems and has an object to provide a method of manufacturing a magnetic disk that can achieve a further reduction in magnetic spacing and that has high reliability even with the low flying height of a magnetic head following the rapid increase in recording density in recent years and with the very strict requirement for environmental resistance following the diversification of applications.

Means for Solving the Problem

As a result of intensive studies, the present inventor has found that the above-mentioned problems can be solved by the following inventions, and has completed this invention.

Specifically, this invention has the following Structures.

Structure 1:

A method of manufacturing a magnetic disk comprising at least a magnetic layer, a protective layer, and a lubricating layer formed in this order over a substrate, wherein the lubricating layer is formed by using a coating solution in which a perfluoropolyether compound comprising a perfluoropolyether main chain and a hydroxyl group in a structure thereof is dispersed and dissolved in a fluorine-based solvent having a boiling point of 90° C. or more.

Structure 2:

The method according to Structure 1, comprising heating the fluorine-based solvent to a temperature in a range of 30° C. or more and lower than a boiling point of the solvent and dissolving the perfluoropolyether compound in the solvent, thereby obtaining the coating solution.

Structure 3:

The method according to Structure 1, wherein the perfluoropolyether compound included in the lubricating layer is a compound comprising four or more hydroxyl groups in a molecule.

Structure 4:

The method according to Structure 1, wherein a number-average molecular weight of the perfluoropolyether compound included in the lubricating layer is in a range of 1,000 to 10,000.

Structure 5:

The method according to Structure 1, wherein the protective layer is a carbon-based protective layer formed by a plasma CVD method.

Structure 6:

The method according to Structure 5, wherein the protective layer comprises nitrogen in an area adjacent to the lubricating layer.

Structure 7:

The method according to any one of Structures 1 to 6, wherein the magnetic disk is a magnetic disk adapted to be mounted in a magnetic disk apparatus of a load/unload system as a start/stop mechanism and to be used with a head flying height of 5 nm or less.

According to Structure 1, the lubricating layer is formed by using a coating solution in which a perfluoropolyether compound comprising a perfluoropolyether main chain and a hydroxyl group in a structure thereof is dispersed and dissolved in a fluorine-based solvent having a boiling point of 90° C. or more. Therefore, the lubricating layer can be coated and formed by heating the solvent and using the coating solution having a temperature in the range of, for example, about 40° C. to 60° C. By using such a coating solution having the temperature in the range higher than room temperature, even if a highly polar lubricant is used, the interaction due to attraction between molecules or polar groups can be weakened to be small so that the polar groups in the molecules of the lubricant are effectively bonded to active sites on the protective layer and thus the adhesion of the lubricating layer can be improved. Further, since the lubricant is not easily aggregated because of the interaction between the molecules thereof being weakened, it is possible to form a thin film in the form of a monomolecular layer when the lubricant is coated on the surface of the magnetic disk. For formation of the lubricating layer, a dipping method is preferably used. In the dipping method, a coating solution is prepared by dissolving a lubricant in a fluorine-based solvent and a disk is dipped into the coating solution in a state where a disk surface is substantially vertical. Thereafter, the disk is lifted upward (generally, in a substantially vertical direction). Thus, film formation is performed. Further, among fluorine-based solvents having a boiling point of 90° C. or more, later-described exemplified solvents each have a higher surface tension and a lower vapor pressure than a fluorine-based solvent generally used conventionally, and therefore, during dip coating, in the process of lifting the disk, a region which is still wet after a disk surface emerges from the coating solution of the lubricant into the air is large. In other words, the still-wet region has a large width (the width in the lifting direction from the liquid surface) and the coating state is hardly subjected to the influence of a ripple (wavy state) of the liquid surface caused upon lifting the disk. In this event, stripe-like coating unevenness hardly occurs upon coating and thus it is possible to form a uniform coating film.

That is, according to this invention, since it is possible to form a lubricating layer in the form of a thin uniform coating film having high adhesion to a protective layer, a further reduction in magnetic spacing can be realized. Further, it is possible to obtain a magnetic disk having high reliability even with the low flying height (5 nm or less) of a magnetic head following the rapid increase in recording density in recent years and with the very strict requirement for environmental resistance following the diversification of applications.

As described in Structure 2, it is prefetreble that the method comprises heating the fluorine-based solvent to a temperature in a range of 30° C. or more and lower than a boiling point of the solvent and dissolving the perfluoropolyether compound in the solvent, thereby obtaining the coating solution.

As described in Structure 3, it is prefetreble that the perfluoropolyether compound included in the lubricating layer is a compound comprising four or more hydroxyl groups in a molecule. The more the number of polar groups in a molecule of the lubricant, the more preferable in terms of increasing the adhesion between the lubricating layer and the protective layer. According to this invention, even if such a highly polar lubricant is used, the interaction thereof can be weakened and, therefore, the lubricant is not easily aggregated and thus is effectively bonded to the protective layer. As a result, the adhesion of the lubricating layer is enhanced.

As described in Structure 4, it is prefetreble that a number-average molecular weight of the perfluoropolyether compound included in the lubricating layer is in a range of 1,000 to 10,000. This is because recoverability can be provided by appropriate viscosity, suitable lubricating performance can be exhibited, and, further, excellent heat resistance can also be provided.

As described in Structure 5, it is preferable that the protective layer is a carbon-based protective layer formed by a plasma CVD method. This is because, according to the plasma CVD method, the carbon-based protective layer with a uniform and dense surface can be formed, which is suitable for this invention. As described in Structure 6, it is preferable that the protective layer contains nitrogen in an area adjacent to the lubricating layer, i.e., on its lubricating layer side, because the adhesion of the lubricating layer is further enhanced.

As recited in Structure 6, the magnetic disk of this invention is suitable as a magnetic disk adapted to be mounted in a magnetic disk apparatus of, particularly, the LUL system. Because of the further reduction in magnetic head flying height following the introduction of the LUL system, the magnetic disk is required to stably operate even in the case of an ultra-low flying height of, for example, 5 nm or less. Therefore, the magnetic disk of this invention having high reliability even with the ultra-low flying height is suitable therefor.

Effect of the Invention

According to this invention, it is possible to provide a magnetic disk that can achieve a further reduction in magnetic spacing and that has high reliability even with the low flying height of a magnetic head following the rapid increase in recording density in recent years and with the very strict requirement for environmental resistance following the diversification of applications.

MODE FOR CARRYING OUT THE INVENTION

Figure 1:
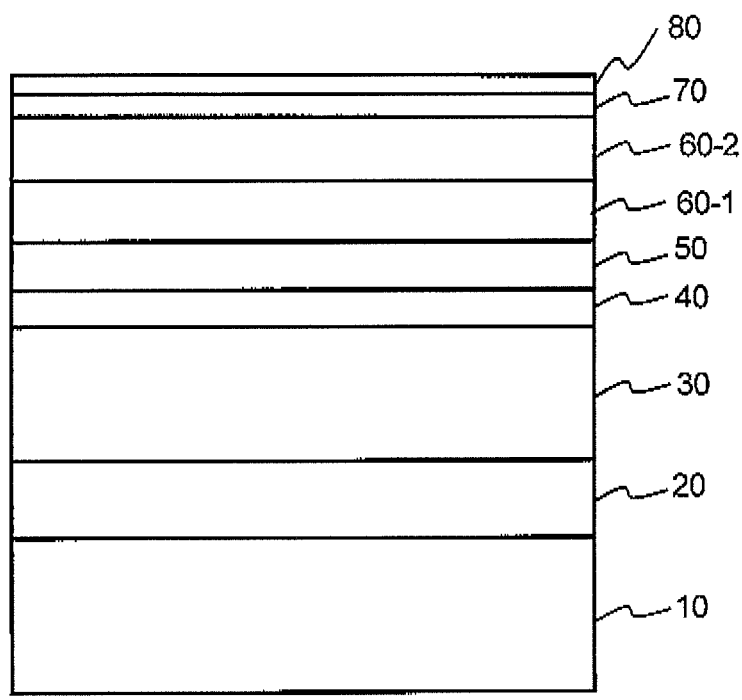
FIG. 1 is a cross-sectional view of a magnetic disk according to Example of this invention.

Hereinbelow, this invention will be described in detail based on an embodiment thereof.

A magnetic disk manufacturing method of this invention is a method of manufacturing a magnetic disk having at least a magnetic layer, a protective layer, and a lubricating layer formed in this order over a substrate, wherein the lubricating layer is formed by using a coating solution in which a perfluoropolyether compound having a perfluoropolyether main chain in a structure thereof and having a hydroxyl group at an end thereof is dispersed and dissolved in a fluorine-based solvent having a boiling point of 90° C. or more.

A lubricant compound contained in a lubricating layer of a magnetic disk of this invention is a perfluoropolyether compound having a perfluoropolyether main chain in a structure thereof and having a hydroxyl group at an end thereof. Use is preferably made of, for example, a compound expressed by a chemical formula of

[Chemical Formula 1]

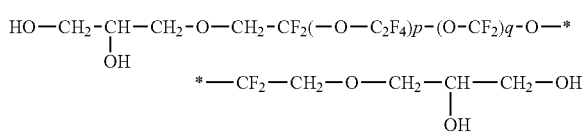

[where p and q are each a natural number]

In this invention, it is particularly preferable that the perfluoropolyether compound contained in the lubricating layer be a compound having four or more hydroxyl groups in a molecule. The more the number of polar groups in a lubricant molecule, the more preferable in terms of increasing the adhesion between the lubricating layer and the protective layer. According to this invention, even if such a highly polar lubricant is used, the interaction thereof can be weakened and, therefore, the lubricant is not easily aggregated and thus is effectively bonded to the protective layer. As a result, the adhesion of the lubricating layer is enhanced.

The above-mentioned compound exemplified as the perfluoropolyether compound contained in the lubricating layer of the magnetic disk of this invention is a perfluoropolyether-based compound having a perfluoropolyether main chain in a structure thereof and having four hydroxyl groups at ends thereof. As the perfluoropolyether lubricant according to this invention, use can alternatively be made of a perfluoropolyether-based compound having a perfluoropolyether main chain in a structure thereof and having two hydroxyl groups at ends thereof. Incidentally, as these perfluoropolyether-based lubricants, use can be made of, as commercial products, for example, Fomblin Z-Tetraol (trade name) and Fomblin Z-DOL (trade name) manufactured by Solvay Solexis, Inc.

The molecular weight of the perfluoropolyether compound according to this invention is not particularly limited, but, for example, the number-average molecular weight (Mn) is preferably in the range of 1,000 to 10,000 and more preferably in the range of 1,000 to 6,000. This is because recoverability can be provided by appropriate viscosity and suitable lubricating performance can be exhibited.

In the case of using a commercial product, the number-average molecular weight (Mn) is preferably set to the range of 1,000 to 10,000 by appropriate molecular weight fractionation. In this event, the method of molecular weight fractionation is not particularly limited, but, for example, use can be made of molecular weight fractionation by a gel permeation chromatography (GPC) method, molecular weight fractionation by a supercritical fluid extraction method, or the like.

When forming the lubricating layer using the above-mentioned lubricant, it can be formed by using a solution in which the above-mentioned lubricant compound is dispersed and dissolved in a solvent and coating the solution, for example, by a dipping method. In this invention, as this solvent, use can be preferably made of a fluorine-based solvent having a boiling point of 90° C. or more.

As the fluorine-based solvent having the boiling point of 90° C. or more which can be preferably used in this invention, the following solvents can be cited, for example.

[Exemplified Solvents]
1. $C_6F_{13}OCH_3$ (boiling point: 98° C.)
2. $C_3HF_6$—$CH(CH_3)O$—$C_3HF_6$ (boiling point: 131° C.)

These fluorine-based solvents can be obtained as commercial products. Use can be made of, for example, HFE7300 (trade name) (Exemplified Solvent 1) or HFE7600 (trade name) (Exemplified Solvent 2) manufactured by Minnesota Mining and Manufacturing (3M) Company.

According to this invention, since the lubricating layer is formed by using the coating solution in which the above-mentioned perfluoropolyether compound is dispersed and dissolved in the above-mentioned fluorine-based solvent having the boiling point of 90° C. or more, the lubricating layer can be coated and formed by heating the above-mentioned solvent to obtain the coating solution having a temperature in the range of, for example, 30° C. or more and lower than the boiling point of the above-mentioned solvent and preferably in the range of, for example, about 40° C. to 60° C. If the temperature of the coating solution is higher than 60° C., the temperature approaches to a boiling point of the solvent and the solvent tends to be evaporated. Therefore, during dip coating, a drying rate after film formation is increased so that a region which is still wet after a disk surface emerges from the coating solution of the lubricant into the air has a small width (i.e., a width in a lifting direction from a liquid surface) and the coating state is susceptible to the influence of a ripple (wavy state) of the liquid surface caused upon lifting the disk. If evaporation of the solvent is accelerated, consumption of the solvent is expedited, resulting in an increase in cost. Furthermore, concentration of the lubricant in the coating solution widely varies to cause variation in thickness of the coating film of the lubricant layer.

By using such a coating solution having the temperature in the range higher than room temperature, even if the highly polar lubricant having, for example, at least four hydroxyl groups in a molecule is dispersed and dissolved in the solvent, the interaction due to attraction between the molecules or the polar groups can be weakened to be small so that the polar groups in the molecules of the lubricant are effectively bonded to active sites on the protective layer and thus the adhesion of the lubricating layer can be improved. Further, since the lubricant is not easily aggregated because of the interaction between the molecules thereof being weakened, it is possible to form a thin film in the form of a monomolecular layer when the lubricant is coated on the surface of the magnetic disk. As already described, the above-mentioned exemplified fluorine-based solvent having the boiling point of 90° C. or more has a higher surface tension and a lower vapor pressure than a fluorine-based solvent generally used conventionally. Therefore, during dip coating, a region which is still wet after a disk surface emerges from the coating solution of the lubricant into the air is large has a large width (the width in the lifting direction from the liquid surface) and the coating state is hardly subjected to the influence of a ripple (wavy state) of the liquid surface caused upon lifting the disk. In this event, stripe-like coating unevenness hardly occurs upon coating and therefore it is possible to form a uniform coating film.

The fluorin-based solvent (trade name: Vertrel) which has been used in common has a surface tension of 14.1 mN/m and a vapor pressure of 0.030 Mpa. On the other hand, the fluorine-based solvent in this invention, for example, HFE7300 (trade name) (Exemplified Solvent 1) has a surface tension of 15.0 mN/m and a vapor pressure of 0.006 Mpa. These values except the boiling point are property values at 25° C.

Conventionally, since it is necessary to prepare a coating solution at room temperature, use is generally made of a liquid lubricant which is a liquid at room temperature. However, in this invention, even a solid lubricant (e.g. perfluoropolyether long-chain alkylamine) which is a solid at room temperature can be completely dissolved and used by heating the solvent of this invention.

In this invention, the lubricating layer is preferably formed by dipping.

In this invention, in order to further improve the adhesion of the lubricating layer to the protective layer, the magnetic disk may be subjected to a heat treatment by exposure to an atmosphere at 50° C. to 150° C. after the formation of the lubricating layer. Alternatively, the magnetic disk may be subjected to ultraviolet (UV) irradiation. That is, the baking treatment or the UV treatment can be carried out as a post-treatment. In this invention, it is also preferable to carry out both the baking treatment and the UV treatment as post-treatments.

In this invention, the lubricating layer can be a thin film with a thickness of, for example, 5 Å to 20 Å. If it is less than 5 Å, the lubrication performance as the lubricating layer may be lowered. If it exceeds 20 Å, it is not preferable in terms of a reduction in film thickness.

As the protective layer in this invention, a carbon-based protective layer can be preferably used. Particularly, an amorphous carbon protective layer is preferable. With the protective layer being particularly the carbon-based protective layer, the interaction between the polar groups (hydroxyl groups) of the lubricant according to this invention and the protective layer is further enhanced so that the operation and effect according to this invention are further exhibited, which is thus preferable.

In this invention, the carbon-based protective layer is preferably a composition gradient layer containing, for example, nitrogen on its lubricating layer side and hydrogen on its magnetic layer side. As a method of making the protective layer contain nitrogen on its lubricating layer side, use may be made of a method of performing nitrogen plasma treatment upon a surface after formation of the protective layer to inject nitrogen ions, a method of further depositing nitrogenated carbon after formation of the protective layer, and so on. With this structure, the adhesion of the lubricant to the protective layer can be increased further so that a lubricating layer with a good coverage can be obtained with a smaller thickness. Thus, the effect of this invention is more effectively obtained.

When using the carbon-based protective layer in this invention, it can be formed, for example, by a DC magnetron sputtering method, but it is preferably an amorphous-carbon-based protective layer particularly formed by a plasma CVD method. Being formed by the plasma CVD method, the surface of the protective layer becomes uniform and dense. Therefore, it is preferable that the lubricating layer by this invention be formed on the protective layer with smaller surface roughness formed by the CVD method.

In this invention, the thickness of the protective layer is preferably set to 20 Å to 70 Å. If it is less than 20 Å, the performance as the protective layer may be lowered. If it exceeds 70 Å, it is not preferable in terms of a reduction in film thickness.

In the magnetic disk of this invention, the substrate is preferably a glass substrate. The glass substrate is rigid and excellent in smoothness and thus is suitable for an increase in recording density. As the glass substrate, an aluminosilicate glass substrate, for example, may be used and, particularly, a chemically strengthened aluminosilicate glass substrate is preferable.

In this invention, the main surface of the substrate is preferably ultra-smooth with Rmax of 6 nm or less and Ra of 0.6 nm or less, more preferably Rmax of 3 nm or less and Ra of 0.3 nm or less. Rmax and Ra herein referred to are based on the JIS B0601 standard.

The magnetic disk obtained by this invention has at least the magnetic layer, the protective layer, and the lubricating layer over the substrate. In this invention, the magnetic layer is not particularly limited and may be an in-plane magnetic recording type magnetic layer or a perpendicular magnetic recording type magnetic layer. However, the perpendicular magnetic recording type magnetic layer is preferable for realizing the rapid increase in recording density in recent years. Particularly, if it is a CoPt-based magnetic layer, high coercive force and high reproduction output can be achieved, which is thus preferable.

In a preferable perpendicular magnetic recording disk as a magnetic disk of this invention, an underlayer may be provided between a substrate and a magnetic layer if necessary. Further, an adhesive layer, a soft magnetic layer, and so on may be provided between the underlayer and the substrate. In this case, as the underlayer, use may be made of, for example, a Cr layer, a Ta layer, a Ru layer, a CrMo alloy layer, a CoW alloy layer, a CrW alloy layer, a CrV alloy layer, or a CrTi alloy layer and, as the adhesive layer, use may be made of, for example, a CrTi alloy layer, a NiAl alloy layer, or an AlRu alloy layer. Further, as the soft magnetic layer, use may be made of, for example, a CoZrTa alloy layer.

As a perpendicular magnetic recording disk suitable for an increase in recording density, a structure is preferable in which an adhesive layer, a soft magnetic layer, an underlayer, a magnetic layer (perpendicular magnetic recording layer), a carbon-based protective layer, and a lubricating layer are provided over a substrate. In this case, it is also preferable to provide an auxiliary recording layer on the perpendicular magnetic recording layer through an exchange coupling control layer interposed therebetween.

According to this invention, since it is possible to form a lubricating layer in the form of a thin uniform coating film having high adhesion to a protective layer, a further reduction in magnetic spacing can be realized. Further, it is possible to obtain a magnetic disk having high reliability even with the low flying height (5 nm or less) of a magnetic head following the rapid increase in recording density in recent years and with the very strict requirement for environmental resistance following the diversification of applications.

That is, the magnetic disk of this invention is suitable as a magnetic disk adapted to be mounted in a magnetic disk apparatus of, particularly, the LUL system. Because of the further reduction in magnetic head flying height following the introduction of the LUL system, the magnetic disk is required to stably operate even in the case of an ultra-low flying height of, for example, 5 nm or less. Therefore, the magnetic disk of this invention having high reliability even with the ultra-low flying height is suitable therefor.

EXAMPLES

Hereinbelow, this invention will be described in further detail with reference to Examples.

Example 1

Referring to FIG. 1, a magnetic disk according to Example 1 of this invention has an adhesive layer 20, a soft magnetic layer 30, a first underlayer 40, a second underlayer 50, magnetic layers 60-1 and 60-2, a carbon-based protective layer 70, and a lubricating layer 80 which are formed in this order over a disk substrate 10.

(Preparation of Lubricant)

As a lubricant, use was made of a commercial perfluoropolyether-based lubricant, Fomblin Z-Tetraol (trade name) manufactured by Solvay Solexis, Inc., having been subjected to molecular weight fractionation by the GPC method to have Mn of 3,000 and a molecular weight dispersion of 1.08.

(Manufacture of Magnetic Disk)

A 2.5-inch glass disk (outer diameter: 65 mm, inner diameter: 20 mm, disk thickness: 0.635 mm) made of a chemically strengthened aluminosilicate glass was prepared as the disk substrate 10. The main surface of the disk substrate 10 was mirror-polished to Rmax of 2.13 nm and Ra of 0.20 nm.

On this disk substrate 10, a Ti-based adhesive layer 20, a Fe-based soft magnetic layer 30, a first underlayer 40 of NiW, a second underlayer 50 of Ru, a magnetic layer 60-1 of CoCrPt—$SiO_2$, and a magnetic layer 60-2 of CoCrPtB were formed in this order in an Ar gas atmosphere by the DC magnetron sputtering method. Each of the magnetic layers 60-1 and 60-2 is a perpendicular magnetic recording type magnetic layer.

Subsequently, a diamond-like carbon protective layer 70 was formed by the plasma CVD method and subjected to nitrogen plasma treatment to make the protective layer contain nitrogen. The protective layer had a thickness of 50 Å.

Then, a lubricating layer 80 was formed in the following manner.

There was prepared a solution in which the lubricant prepared as described above was dispersed and dissolved in a fluorine-based solvent, HFE7300 (trade name) manufactured by Minnesota Mining and Manufacturing (3M) Company, which corresponds to the above-mentioned exemplified solvent 1, at a concentration of 0.2 wt % at a liquid temperature of 45° C. Using this solution as a coating solution, a magnetic disk formed with the layers up to the protective layer 70 was immersed therein and coated therewith by the dipping method, thereby forming the lubricating layer 80. No coating unevenness occurred.

After forming the lubricating layer 80, the magnetic disk was heat-treated in a vacuum furnace at 130° C. for 90 minutes. The thickness of the lubricating layer 80 was measured by a Fourier transform infrared spectrophotometer (FTIR) and it was 15 Å. In this manner, the magnetic disk of Example 1 was obtained.

Comparative Example 1

As a lubricant, use was made of a commercial perfluoropolyether-based lubricant, Fomblin Z-Tetraol (trade name) manufactured by Solvay Solexis, Inc., having been subjected to molecular weight fractionation by the GPC method to have Mn of 3,000 and a molecular weight dispersion of 1.08, which was the same as in Example 1. There was prepared a solution (room temperature) in which the above-mentioned lubricant was dispersed and dissolved in a fluorine-based solvent, Vertrel XF (trade name) manufactured by DuPont-Mitsui Fluorochemicals Co., Ltd. Using this solution as a coating solution, a magnetic disk formed with layers up to a protective layer was immersed therein and coated therewith by the dipping method, thereby forming a lubricating layer. Herein, the concentration of the coating solution was properly adjusted so that the lubricant coverage became equal to 95% which is the same as that of the magnetic disk in Example 1. Stripe-like coating unevenness occurred on the outer peripheral side of the surface of the magnetic disk.

In Comparative Example 1, the magnetic disk was manufactured in the same manner as in Example 1 except the above-mentioned point.

Then, the magnetic disks of Example 1 and Comparative Example 1 were evaluated by the following test methods.

Figure 2:
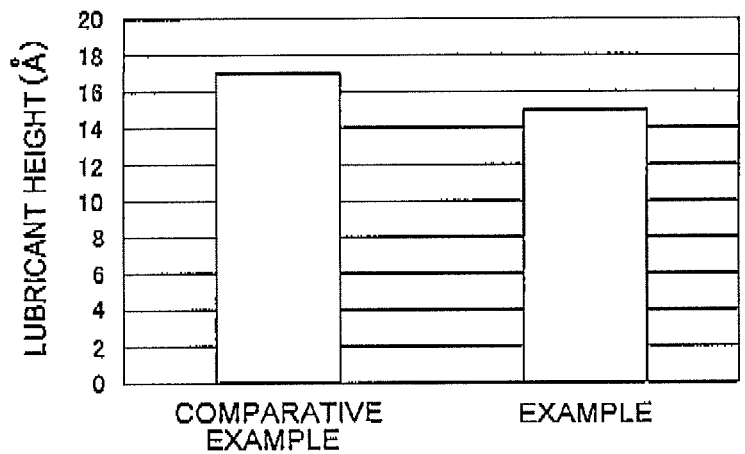
FIG. 2 is a diagram showing the results of a comparison between lubricant heights measured by an AFM in the Example and Comparative Example.

FIG. 2 shows the results of measurement of the lubricant height (level difference) using an atomic force microscope (AFM). Specifically, the lubricant was coated on the half of the magnetic disk under the above-mentioned conditions of Example 1 and Comparative Example 1 and the level difference formed at the boundary thereof was measured by the AFM.

Figure 3:
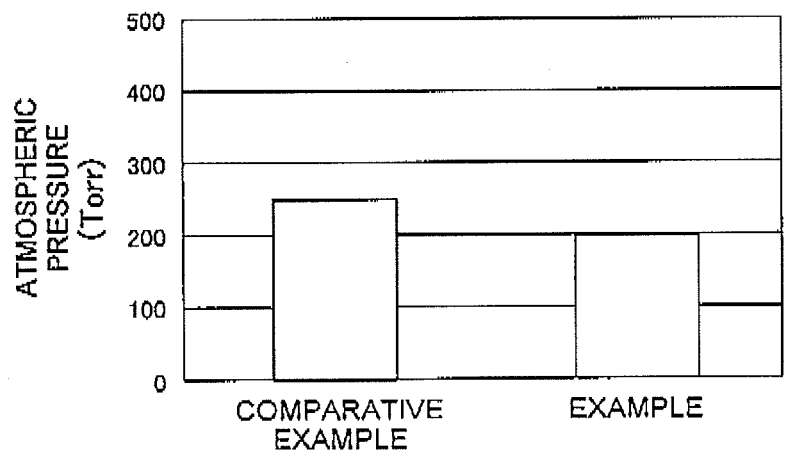
FIG. 3 is a diagram showing the results of a comparison between magnetic head contact start heights according to pressure reduction in the Example and the Comparative Example.

FIG. 3 shows the results of a comparison between atmospheric pressures measured in Example 1 and Comparative Example 1 such that a magnetic head was caused to once fly on the inner peripheral side of the magnetic disk (position of disk radius 15 mm), then the pressure in an apparatus was gradually reduced, and then the pressure upon contact of the magnetic head on the surface of the magnetic disk was measured.

From the results of FIGS. 2 and 3, it is seen that, in Example 1 of this invention, both the lubricant height upon coating and the magnetic head contact start height (touch-down height) according to pressure reduction are lower than those in Comparative Example 1 and thus the lubricating layer can be reduced in thickness.

Then, a LUL (load/unload) durability test was performed for evaluating the LUL durability of the magnetic disk.

A LUL-system HDD (5400 rpm rotation type) was prepared and a magnetic head with a flying height of 5 nm and the magnetic disk of Example 1 were mounted therein. A slider of the magnetic head was a NPAB (negative pressure air bearing) slider and was mounted with a magnetoresistive effect element (GMR element) as a reproducing element. A shield portion was made of a FeNi-based permalloy. By causing the LUL-system HDD to continuously repeat the LUL operations, the number of LUL times endured by the magnetic disk up to the occurrence of failure was measured.

As a result, the magnetic disk of Example 1 endured the LUL operations of 700,000 times with no failure at an ultra-low flying height of 5 nm and no fly stiction failure occurred. Since a magnetic disk is currently judged to be preferable if it endures 600,000 times or more, it can be said that the magnetic disk of Example 1 has very high reliability.

The surface of the magnetic disk after the LUL durability test was observed in detail using an optical microscope and an electron microscope and was found to be excellent, i.e. no abnormality such as damage or dirt was observed. Further, the surface of the magnetic head after the LUL durability test was observed in detail using an optical microscope and an electron microscope and was found to be excellent, i.e. no abnormality such as damage or dirt was observed and, further, no lubricant adhesion to the magnetic head or no corrosion failure was observed.

That is, according to this invention, since the lubricating layer reduced in thickness can be formed and further the high durability (reliability) can be obtained, a reduction in magnetic spacing, i.e. in clearance between the magnetic head and the medium, can be realized.

A LUL durability test was performed also for the magnetic disk of Comparative Example 1 with an ultra-low flying height of 5 nm in the same manner as in Example 1. As a result, the magnetic disk of Comparative Example 1 was subjected to the occurrence of fly stiction failure midway and failed by head crash when the number of LUL times reached 400,000 times. The surface of the magnetic disk after the LUL durability test was observed in detail using an optical microscope and an electron microscope and, as a result, damage or the like was slightly observed. Further, the surface of a magnetic head after the LUL durability test was observed in detail using an optical microscope and an electron microscope and, as a result, lubricant adhesion to the magnetic head and corrosion failure were observed.

Example 2

A lubricating layer was formed in the following manner.

There was prepared a solution in which a lubricant prepared in the same manner as in Example 1 was dispersed and dissolved in a fluorine-based solvent, HFE7600 (trade name) manufactured by Minnesota Mining and Manufacturing (3M) Company, which corresponds to the above-mentioned exemplified solvent 2, at a concentration of 0.2 wt % at a liquid temperature of 45° C. Using this solution as a coating solution, a magnetic disk formed with layers up to a protective layer was immersed therein and coated therewith by the dipping method, thereby forming the lubricating layer. No coating unevenness occurred.

After forming the lubricating layer, the magnetic disk was heat-treated at 130° C. for 90 minutes and subjected to ultraviolet irradiation. The thickness of the lubricating layer was measured by a Fourier transform infrared spectrophotometer (FTIR) and it was 15 Å. Accordingly, the magnetic disk of Example 2 was obtained in the same manner as in Example 1 except the formation of the lubricating layer.

In the same manner as in Example 1, the lubricant height upon coating and the magnetic head contact start height (touch-down height) according to pressure reduction were evaluated for the magnetic disk of Example 2. As a result, the same results as those in the case of the magnetic disk of Example 1 were obtained.

Then, as a result of performing a LUL durability test, the magnetic disk of Example 2 endured the LUL operations of 700,000 times with no failure at an ultra-low flying height of 5 nm and no fly stiction failure occurred. It can be said that the magnetic disk of Example 2 has very high reliability. The surface of the magnetic disk after the LUL durability test was observed in detail using an optical microscope and an electron microscope and was found to be excellent, i.e. no abnormality such as damage or dirt was observed. Further, the surface of a magnetic head after the LUL durability test was observed in detail using an optical microscope and an electron microscope and was found to be excellent, i.e. no abnormality such as damage or dirt was observed and, further, no lubricant adhesion to the magnetic head or no corrosion failure was observed.

Comparative Example 2

As a lubricant, use was made of a commercial perfluoropolyether-based lubricant, Fomblin Z-Tetraol (trade name) manufactured by Solvay Solexis, Inc., having been subjected to molecular weight fractionation by the GPC method to have Mn of 3,000 and a molecular weight dispersion of 1.08, which was the same as in Example 1. There was prepared a solution (temperature: 30° C.) in which the above-mentioned lubricant was dispersed and dissolved in a fluorine-based solvent, HFE7200 (trade name) (having a boiling point of 76° C.) manufactured by Minnesota Mining and Manufacturing (3M) Company. Using this solution as a coating solution, a magnetic disk formed with layers up to a protective layer was immersed therein and coated therewith by the dipping method, thereby forming a lubricating layer. Herein, the concentration of the coating solution was properly adjusted so that the lubricant coverage became approximately the same as that of the magnetic disk in Example 1. Stripe-like coating unevenness occurred on the outer peripheral side of the surface of the magnetic disk.

In Comparative Example 2, the magnetic disk was manufactured in the same manner as in Example 1 except the above-mentioned point.

In the same manner as in Example 1, the lubricant height upon coating and the magnetic head contact start height (touch-down height) according to pressure reduction were evaluated for the magnetic disk of Comparative Example 2. As a result, the same results as those in the case of the magnetic disk of Comparative Example 1 were obtained.

A LUL durability test was performed for the magnetic disk of Comparative Example 2 with an ultra-low flying height of 5 nm in the same manner as in Example 1. As a result, the magnetic disk of Comparative Example 2 was subjected to the occurrence of fly stiction failure midway and failed by head crash when the number of LUL times reached 400,000 times. The surface of the magnetic disk after the LUL durability test was observed in detail using an optical microscope and an electron microscope and, as a result, damage or the like was slightly observed. Further, the surface of a magnetic head after the LUL durability test was observed in detail using an optical microscope and an electron microscope and, as a result, lubricant adhesion to the magnetic head and corrosion failure were observed.

What is claimed is:

1. A method of manufacturing a magnetic disk comprising at least a magnetic layer, a protective layer, and a lubricating layer formed in this order over a substrate, wherein the lubricating layer is formed by:
   first dispersing and dissolving a perfluoropolyether compound comprising a perfluoropolyether main chain and four or more hydroxyl groups in a structure thereof in a fluorine-based solvent having a boiling point of 90° C. or more to obtain a coating solution;
   heating the coating solution to a temperature in a range of 45° C. to 60° C. such that the temperature of the coating solution is lower than a boiling point of the solvent and the perfluoropolyether compound is dissolved in the solvent; and then
   coating the magnetic disk having the magnetic layer and the protective layer with the coating solution having the temperature of 45° C. to 60° C. to form the lubricating layer by dipping and immersing the magnetic disk having the magnetic layer and the protective layer into the coating solution having the temperature of 45° C. to 60° C., and then lifting the magnetic disk out of the coating solution to obtain the lubricating layer uniformly coated on the protective layer.

2. The method according to claim 1, wherein a number-average molecular weight of the perfluoropolyether compound included in the lubricating layer is in a range of 1,000 to 10,000.

3. The method according to claim 1, wherein the protective layer is a carbon-based protective layer formed by a plasma CVD method.

4. The method according to claim 3, wherein the protective layer comprises nitrogen in an area adjacent to the lubricating layer.

5. The method according to claim 1, wherein the magnetic disk is a magnetic disk adapted to be mounted in a magnetic disk apparatus of a load/unload system as a start/stop mechanism and to be used with a head flying height of 5 nm or less.

6. The method according to claim 1, wherein the fluorine-based solvent is represented by either formula (1) or formula (2):

$$C_6F_{13}OCH_3 \qquad (1)$$

$$C_3HF_6\text{—}CH(CH_3)O\text{—}C_3HF_6 \qquad (2).$$

* * * * *